March 2, 1965 P. T. KERSH 3,171,913
PERMANENT MAGNET INERTIA SWITCH
Filed July 11, 1962
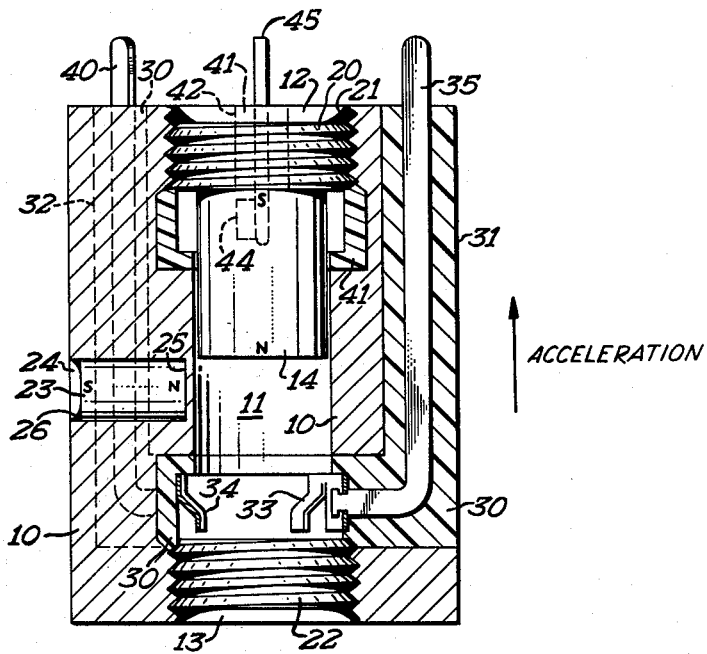
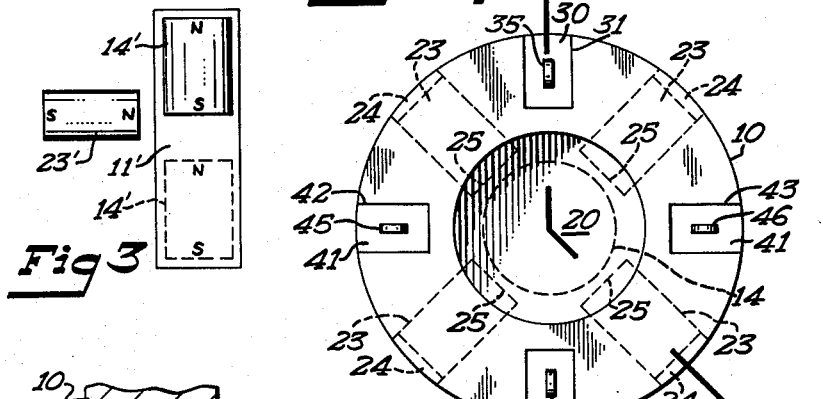
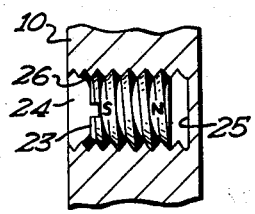
INVENTOR.
PHILIP T. KERSH
BY
ATTORNEY

# United States Patent Office 3,171,913
Patented Mar. 2, 1965

3,171,913
PERMANENT MAGNET INERTIA SWITCH
Philip T. Kersh, Columbia Heights, Minn., assignor to Honeywell Inc., a corporation of Delaware
Filed July 11, 1962, Ser. No. 209,028
7 Claims. (Cl. 200—61.53)

The present invention relates in general to switching devices actuated by inertial forces and in particular to a magnetically detented inertial switch suitable for use in either snap switch or integrating applications.

An inertial snap switch is used to sense a sudden acceleration or deceleration of a predetermined magnitude. For example, a device of this nature could be placed in an automobile to deenergize the ignition system upon sensing the impact of a collison. An integrating inertial switch or accelerometer is commonly used in the missile field to indicate the attainment of a predetermined velocity. At this velocity the switch might perform a function such as cutting off the fuel to a booster. It is common in this type of device to have a seismic mass which moves in response to the applied inertial force. The movement of the seismic mass is normally limited by the walls of a chamber containing the seismic mass.

A major problem has been the selection of means to restrain the seismic mass in a normal position until the desired inertial force is achieved. The accuracy of the device in any particular application depends to a great extent upon the sensitivity and reliability of the means opposing the movement of the seismic mass. Of the means used to bias the seismic mass to a normal position, those involving springs have been most common. The prior art shows that a spring may be used to hold the seismic mass in a normal position until the inertial force overcomes the force of the spring. Springs, however, are difficult to manufacture and adjust to the degree of accuracy required in many applications; they have a tendency to change in sensitivity with a change in environmental conditions and they are prone to change their characteristics in those applications which require repeated use. In addition, the problem of friction is acute in those devices utilizing spring loaded detent means.

Permanent magnets have also been used to bias the seismic mass to a normal position. Some devices disclosed in the prior art have used a magnet in conjunction with a spring, thereby incorporating the inherent disadvantages of the spring. Other devices have used magnets in conjunction with complicated electromagnetic damping circuitry, thus tending to unduly increase the difficulty of manufacture, especially in the miniature form necessary in most military applications. Still other devices have used a permanent magnet to hold a magnetic ball-shaped seismic mass in a normal position. These devices present difficulties in the adjustment of the magnetic attraction necessary to hold the nonmagnetized ball until the precise inertial force required is reached. Variations in the shape of the ball, or in the exact normal position of the ball, may result in a variance in flux density through the ball.

Many applications also require that the seismic mass be held in the actuated position after the inertial force is removed. Since the seismic mass will tend to return to its normal position because of the magnetic attraction from the permanent magnet, additional mechanical holding means must be introduced to hold the seismic mass in the actuated position. The addition of mechanical holding means necessarily results in manufacturing problems and tends to reduce the reliability of the device.

The device disclosed in the invention has a permanently magnetized piston-like seismic mass held in a normal position within an elongated chamber by the repulsion existing between the mass and a ring of magnetized detents surrounding the chamber. No springs are used to bias the seismic mass to the normal position nor is any complicated electrical circuitry required. A unique feature of the device is the fact that the magnetized detents exert a repulsive force on the seismic mass to hold it in the normal position, and exert an attractive force on the seismic mass to hold it in the actuated position after the inertial force is removed. A reversal of magnetic forces takes place during the travel of the seismic mass; thus, the device is inherently snap-acting but also amenable to construction as an integrating accelerometer through the introduction into the chamber of a suitable damping fluid to time the movement of the seismic mass from the normal position to the actuated position. The tendency of many commonly used detent devices is to bias the seismic mass in a lateral direction, as well as in the desired longitudinal direction, thus tending to increase the sliding friction. The problem of friction is virtually eliminated here since no mechanical detents are required. The magnetic repulsive force is substantially equal around the entire circumference of the piston and tends to hold the piston centered in the chamber.

The primary object of the present invention is to provide an inertial switch having magnetized detent means to restrain a magnetized seismic mass in a normal position and to hold the seismic mass in an actuated position after the inertial force is removed.

A further object is to provide an inertial switch having high reliability and good stability over wide environmental conditions.

A still further object is to provide an inertial switch, the design of which is suitable for use in either a snap switch model or in an integrating accelerometer.

A further object is to provide an inertial switch capable of being manufactured in miniature form at low cost, and having adaptability to a range of threshold and G-second requirements without major design revisions.

A further object is to provide an inertial switch having a minimum amount of friction arising between the seismic mass and the chamber during operation of the device.

Other objects of this invention will be apparent from the specification and claims when considered in connection with the accompanying drawings in which:

FIGURE 1 is a vertical 135 degree sectional view showing the preferred embodiment of my invention;

FIGURE 2 is a top view of the device showing the relative positions of the various components of my invention;

FIGURE 3 is a schematic representation of an alternate embodiment of my invention; and FIGURE 4 is an enlarged view of the magnetized detents showing an alternate method of construction.

Referring now to the drawings of FIGURE 1, there is illustrated a sectional side view of the proposed inertial switch. A 135 degree section as shown by line 1—1 in FIGURE 2 was selected in order to more clearly set out the relationship existing between the various components. A casing 10 composed of a non-magnetic material forms the body of the device and serves as a support and shield for the various components located therein. A cylindrical chamber 11 is located within casing 10 along the longitudinal central axis and has openings 12 and 13 at either end of casing 10. Located within chamber 11 is a piston-like cylindrical magnet 14 having end to end polarization as shown on the drawing. The diameter of piston 14 is slightly smaller than the diameter of chamber 11 to allow longitudinal movement of piston 14 within chamber 11. To limit the longitudinal travel of piston 14, a screw-like non-magnetic plug 20 is threaded into opening 12 of casing 10. Plug 20 is secured firmly in place through the use of an epoxy glue 21. Opening 13 at the opposite end of chamber 11 is closed in a similar manner by plug 22. Plugs 20 and 22 therefore serve as stops for movable piston 14.

A group of bar magnets 23 is mounted in casing 10 at an intermediate distance from the ends of casing 10. As illustrated in FIGURE 2, magnets 23 are evenly spaced around chamber 11 in a plane generally normal to the axis of chamber 11 and have all like poles pointing inward. Magnets 23 are inserted in openings 24 in casing 10. Openings 24 terminate in a closed end 25 to prevent magnets 23 from extending into chamber 11. FIGURE 4 shows one method of affixing magnets 23 in opening 24. Magnets 23 are threaded into opening 24 to a desired depth and then secured firmly in place with an epoxy glue 26.

Surrounding chamber 11 adjacent plug 22 is a ring of dielectric material 30. Conduit-like grooves 31 and 32 are cut longitudinally on opposing sides of casing 10 to carry two extensions of dielectric material 30. A metallic switching contact 33 and a metallic switching contact 34 are affixed to dielectric material 30 so as to protrude into chamber 11 from opposite sides. A metallic conductor 35 is connected to switching contact 33 and is insulated from casing 10 by the dielectric material 30 contained in conduit 31. Conductor 35 thereby provides an external electrical connection for switching contact 33. A metallic conductor 40 is connected to switching contact 34 to provide an external electrical connection therefor. Conductor 40 is carried within conduit 32 and is insulated from metal casing 10 by dielectric material 30. Another ring of dielectric material 41 surrounds chamber 11 adjacent plug 20. Two conduit-like grooves 42 and 43 are cut longitudinally in casing 10 to provide a path for two extensions of dielectric material 41. A metallic switching contact 44 is mounted on dielectric material 41 to protrude into chamber 11 as shown in phantom. A similar contact, not shown, protrudes into chamber 11 from the opposite side. A metallic conductor 45 is connected to switching contact 44 and is carried within dielectric material 41 in groove 42 to provide an external electrical contact. A similar electrical conductor 46 is embedded in dielectric material 41 in conduit 43 to provide an external electrical contact for the opposite switch which is not shown.

*Operation*

In the normal non-actuated condition, the piston 14 is retained in the position shown in FIGURE 1 by the magnetically repulsive forces existing between adjacent like poles of piston 14 and magnets 23. Since detent magnets 23 are arranged evenly around chamber 11, the net effect is a substantially balanced repulsive force around the entire circumference of piston 14. The magnitude of this repulsive force tending to bias piston 14 against plug 20 can be adjusted by changing the distance between piston 14 and magnets 23. As illustrated in FIGURE 4, this can be easily done by changing the position of threaded magnets 23 in openings 24. The repulsive force could also be varied by changing the size of detent magnets 23 or by changing the size and weight of piston 14. While in the normal position, piston 14 establishes an electrical circuit between conductor 45 and conductor 46. Under the influence of a suitable inertial force, piston 14 moves from the normal position downward through chamber 11. During this travel, piston 14 passes through the natural unstable equilibrium point with respect to detent magnets 23. At this time detent magnets 23 no longer repel piston 14, but act to draw and retain it to the actuated position adjacent plug 22. After the inertial force is removed the attraction between unlike poles of piston 14 and detent magnets 23 tend to hold piston 14 in the actuated position. In this actuated position an electrical circuit is established through conductor 35, switching contact 33, piston 14, switching contact 34 and conductor 40.

For non-integrating or snap switch applications a hole, not shown, is drilled completely through piston 14 along its longitudinal axis. The air in chamber 11 is allowed to pass freely through the hole to eliminate any damping effect as piston 14 moves from its normal position to its actuated position. Snap action is thus achieved at the exact moment the inertial force overcomes the magnetic repulsive force. For integrating applications, piston 14 is solid and a damping effect is achieved by allowing air or other damping fluid to flow between piston 14 and the walls of chamber 11. The distance between the sides of piston 14 and the walls of chamber 11 would determine the damping effect for any particular application.

Referring now to FIGURE 3, there is illustrated schematically an alternate configuration of the proposed device. The polarity of the piston magnet 14' has been reversed so that it is held in a normal position at the top of chamber 11' by magnetic attraction to the detent magnets 23' rather than by magnetic repulsion. Upon receiving a suitable inertial force, piston 14' would move to the bottom of chamber 11'. Piston 14' would be held in the resultant actuated position by magnetic repulsion existing between like poles of piston 14' and magnetized detent 23' after the inertial force is removed.

It is apparent that the exact number of detent magnets 23 and their exact location in casing 10 is not limited to the number and positions shown on the drawings. Depending upon the particular application, a different number of detent magnets may be required to achieve the best results. In some applications it may be desirable to replace the individual detent magnets with a single ring magnet surrounding chamber 11.

From the above description, it will be apparent that I have invented an inertial switch having new and more effective means of biasing the seismic mass to a normal position and of holding the seismic mass in the actuated position after the inertial force is removed. Although the form of the invention described herein constitutes a preferred embodiment, it will be understood that changes may be made within the spirit of the invention limited only by the scope of the appended claims.

I claim as my invention:

1. A device responsive to inertial forces, comprising: a permanently magnetized cylindrical seismic mass having end-to-end polarization; an elongated non-magnetic cylindrical tube having a closed first end and a closed second end, and said tube surrounding said mass and allowing movement of said mass throughout the length of said tube while limiting transverse movement therein; magnetic detent means mounted annularly around said tube in a plane generally perpendicular to the axis of said tube at a distance from said first end which is greater than the length of said mass, and said detent means being polarized to have a single polarity pointed inwardly; said mass being restrained at said first end by the magnetic repulsion existing between like poles of said mass and said detent means; and means located at said ends adapted to initiate a signal upon sensing the movement of said mass between said first end and said second end; said mass being moved toward said second end upon the application of an inertial force sufficient to overcome said repulsive force thereby passing through a magnetic equilibrium point with respect to said detent means whereupon a reversal of magnetic forces takes place between said mass and said detent means; said detent means thereafter aiding said inertial force in moving said mass toward said second end and magnetically holding said mass at said second end by the magnetic attraction between unlike poles after said inertial force is removed.

2. An inertial device, comprising: a nonmagnetic casing forming a cylindrical chamber with a closed first end and a closed second end; a cylindrical magnetized inertial element having an outside diameter closely corresponding to the inside diameter of said chamber and located in a first position at said first end and movable longitudinally within the limits established by said chamber; magnets mounted in said casing at equal intervals around said chamber in a plane perpendicular to the path of movement of said element and at a distance from said first end greater than the length of said element; said magnets having a first polarity facing outward and a second polarity facing inward toward said chamber; first switch means mounted at said first end adapted to establish an electrical circuit through said element when said element is in said first position and to break said electrical circuit when said element moves from said first position; and second switch means mounted at said second end adapted to establish an electrical circuit through said element upon the arrival of said element at said second end; said element having a first polarity adjacent said first end and a second polarity at the opposite end, and being held in said first position by a magnetic repulsion existing between said second polarity of said element and said second polarity of said magnets; said element being induced to move toward a second position at said second end upon the application to said element of an inertial force sufficient to overcome said repulsion of said magnets; said element thus moving from said first position, through the plane formed by said magnets and finally into said second position in which said first polarity of said element is located in close proximity to said second polarity of said magnets, thereby being attracted to said magnets and being magnetically held in said second position after said inertial force is removed.

3. An inertial device, comprising: a nonmagnetic casing forming a cylindrical chamber with a closed first end and a closed second end; a cylindrical magnetized inertial element having an outside diameter closely corresponding to the inside diameter of said chamber and located in a first position at said first end and movable longitudinally within the limits established by said chamber; magnets adjustably mounted in said casing at equal intervals around said chamber in a plane perpendicular to the path of movement of said element and at a distance from said first end greater than the length of said element; said magnets having a first polarity facing outward and a second polarity facing inward toward said chamber; first switch means mounted at said first end adapted to establish an electrical circuit through said element when said element is in said first position and to break said electrical circuit when said element moves from said first position; and second switch means mounted at said second end adapted to establish an electrical circuit through said element upon the arrival of said element at said second end; said element having a first polarity adjacent said first end and a second polarity at the opposite end, and being held in said first position by a magnetic repulsion existing between said second polarity of said element and said second polarity of said magnets; the magnitude of which is dependent upon the adjustment of said magnets; said element being induced to move toward a second position at said second end upon the application to said element of an inertial force sufficient to overcome said repulsion of said magnets; said element thus moving from said first position, through the plane formed by said magnets and finally into said second position in which said first polarity of said element is located in close proximity to said second polarity of said magnets, thereby being attracted to said magnets and being magnetically held in said second position after said inertial force is removed.

4. An integrating accelerometer, comprising: a non-magnetic casing forming a sealed cylindrical chamber and having a gaseous damping fluid therein; permanently magnetized cylindrical piston means located at a first end of said chamber and having an outside diameter smaller than the inside diameter of said chamber, thereby being movable throughout the length of said chamber; magnetic detent means adjustably mounted in said casing within a toroidal area surrounding said chamber at a distance from said first end greater than the length of said piston means; said detent means exerting a magnetically repulsive force on said piston means to retain said piston means at said first end; said piston means moving from said first end to a second end of said chamber in response to an inertial force of sufficient magnitude to overcome the repulsive force of said detent means and of sufficient duration to overcome the damping effect of said fluid flowing between said piston means and said chamber; said piston means becoming magnetically attracted to said detent means at said second end and said detent means thereby holding said piston means at said second end by magnetic attraction between unlike poles after said inertial force is removed; and monitoring means mounted adjacent to said first end and said second end so as to indicate the movement of said piston means from said first end to said second end.

5. An acceleration responsive device, comprising: a non-magnetic casing having a closed cylindrical chamber arranged longitudinally therein; permanently magnetized piston means forming a cylindrical seismic mass movable in a longitudinal direction within said chamber in response to inertial forces acting thereupon; magnetic detent means mounted within said casing adjacent said chamber at an intermediate distance from the ends of said chamber; said magnetic detent means and said piston means initially having similar poles adjacent each other, said detent means thereby magnetically repulsing said piston means to bias said piston means to a first position within said chamber; and signaling means located adjacent said chamber so as to respond to longitudinal movement of said piston from said first position to a second position; said piston means overcoming said bias and moving to said second position within said chamber upon the application of a suitable inertial force thereto; said detent means being adapted to magnetically restrain said piston means at said second position by the attraction of opposite poles adjacent each other after removal of said inertial force.

6. An inertial device, comprising: a permanently magnetized inertial element; a non-magnetic casing restraining said element in an elongated chamber having a closed first end and a closed second end within which said element is limited to move in a predetermined direction for a predetermined distance when said element is acted upon by a suitable inertial force; said element having a normal first position at said first end of said chamber, and an actuated second position at said second end of said chamber; permanently magnetized detent means mounted in said casing adjacent a central portion of said chamber; and sensing means responsive to the position of said inertial element; said element being held in said first position under normal conditions by the force of magnetic repulsion existing between said detent means and said element, and moving from said first position only upon receiving an inertial force sufficient to overcome said magnetic repulsion; said detent means continuing to repel said element until said inertial force moves said element through said detent means whereupon a reversal of magnetic forces takes place causing said detent means to attract said element; said element thus being held in said second position by the magnetic attraction of said detent means after said inertial force is removed.

7. A device responsive to inertial forces, comprising: a non-magnetic body having an elongated chamber with a closed first end and a closed second end therein; permanently magnetized piston means located in said chamber having lateral dimensions closely corresponding to the lateral dimensions of said chamber and being movable throughout the length of said chamber in response to externally applied inertial forces; permanently magnetized detent means mounted in said body adjacent said chamber at an intermediate distance from the ends of said chamber so as to exert upon said piston means a magnetic force, the direction and magnitude of which depends upon the position of said detent means in said body and the position of said piston means in said chamber; and monitoring means mounted in said body adapted to sense the movement of said piston means and transmit a signal in response to said movement; said piston means being held at said first end by said magnetic force until subjected to an inertial force of sufficient magnitude and duration to overcome said magnetic force thereupon moving to said second end, and being held at said second end by an opposite magnetic force after said inertial force is removed.

References Cited by the Examiner

UNITED STATES PATENTS

| | | | |
|---|---|---|---|
| 2,319,010 | 5/43 | McLeod | 200—61.53 |
| 2,963,562 | 12/60 | Mishler | 200—61.45 |
| 2,986,615 | 5/61 | Hardway | 200—61.45 |
| 2,997,557 | 8/61 | Gillmor | 200—61.45 |
| 2,997,883 | 8/61 | Wilkes | 200—61.53 |

BERNARD A. GILHEANY, *Primary Examiner.*